Oct. 2, 1956 L. M. LAYDEN 2,765,144
VALVE FOR GAS ARC WELDING APPARATUS
Filed Nov. 8, 1952 2 Sheets-Sheet 1
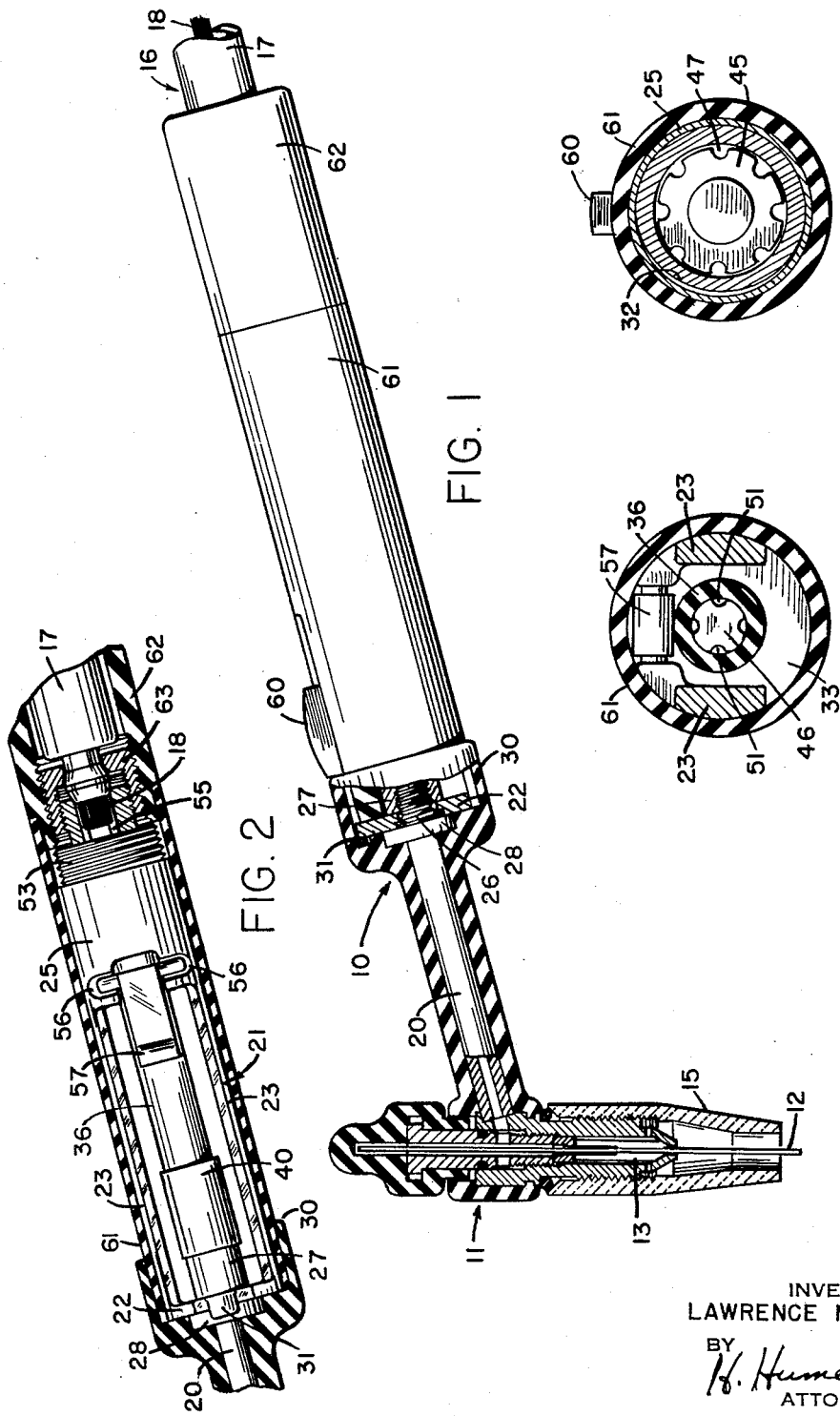
INVENTOR
LAWRENCE M. LAYDEN
BY
H. Hume Mathews
ATTORNEY Oct. 2, 1956    L. M. LAYDEN    2,765,144
VALVE FOR GAS ARC WELDING APPARATUS
Filed Nov. 8, 1952    2 Sheets-Sheet 2

INVENTOR
LAWRENCE M. LAYDEN
BY H. Hume Mathews
ATTORNEY

United States Patent Office 2,765,144
Patented Oct. 2, 1956

2,765,144

VALVE FOR GAS ARC WELDING APPARATUS

Lawrence M. Layden, New Providence, N. J., assignor to Air Reduction Company, Incorporated, New York, N. Y., a corporation of New York Application November 8, 1952, Serial No. 319,491

1 Claim. (Cl. 251—339)

This invention relates to fluid valves generally and more particularly to manually operated gas valves in gas shielded arc welding apparatus.

In gas-arc welding a flowing stream of gas is supplied in such a manner as to envelop the arc, the arc end of the welding electrode or electrodes, and the weld puddle. While there are several varieties of gas-arc welding processes or apparatus for all of which this invention is applicable, this specification will be devoted to a description of the application of the invention to apparatus for welding with a non-consumable electrode, such as tungsten, and an inert monatomic shielding gas such as helium or argon, and in which the welding arc is established between the electrode and the work to be welded. Many varieties of light weight manual apparatus, hereinafter referred to as electrode holders, have been provided for the performance of this process. The apparatus of Nelson E. Anderson Patent Number 2,512,707, dated June 27, 1950, is representative of such an electrode holder. Shielding gas such as argon is admitted to the device at the back of the handle and passes therethrough in appropriately provided passageways to emerge from the nozzle as a protective envelope about the arc.

For purposes of simplicity and economy it has been found advantageous to provide a manually operable valve to control the flow of this shielding gas through the apparatus. It is most convenient for the operator to have such a valve built into the electrode holder. It is therefore the object of this invention to provide a novel fluid valve and apparatus for such use.

Referring to the drawings,

Figure 1 is a partially sectioned elevational view of an electrode holder incorporating the present invention.

Figure 2 is a plan view partially in section of the portion of the electrode holder of Figure 1 that contains the novel valve of this invention.

Figure 5 is a transverse sectional view taken along line 5—5 of Figure 3.

Figure 6 is a transverse sectional view taken along line 6—6 of Figure 3.

Figure 3:
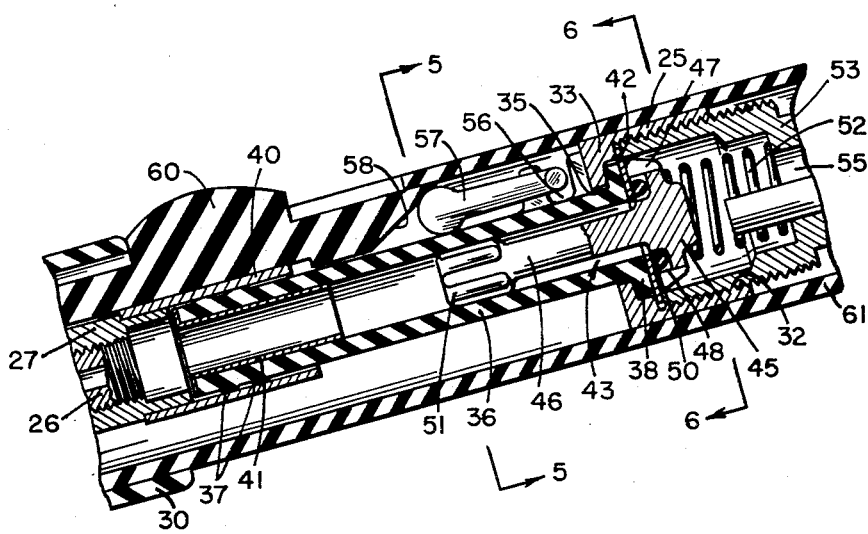
Figure 3 is a sectional elevational view, on an enlarged scale of the valve portion of the electrode holder of Figure 1 showing the relationship of the parts when the valve is closed.

The electrode holder comprises a handle portion 10 and a body portion 11 (Fig. 1). A welding electrode 12 is supported in a chuck 13 forming part of the body portion 11 of the electrode holder. A gas nozzle 15 attached to the body portion 11 surrounds the electrode 12. Shielding gas and welding current are supplied to the electrode holder by a conduit 16 which enters the back end of handle portion 10. This conduit consists of a flexible tube or hose 17 and an enclosed stranded copper conductor 18. Welding current supplied by the copper conductor 18 is carried by the metal parts of the handle portion 10 and the body portion 11 to the chuck 13 from which it is introduced to the welding electrode 12. Shielding gas, conducted to the electrode holder through tube 17, passes through appropriately provided conduits in the handle 10 to the valve which will be more fully described hereinafter. From the valve the shielding gas flows through conduit 20 to the body portion 11. Gas passages in the body portion 11 deliver the gas to the interior of nozzle 15 from which it emerges as an annular flow stream surrounding the electrode 12.

Since electrode holders of the type briefly described above are normally used with helium or argon shielding gas it is desirable to have a valve arrangement to make it possible for the operator to economize on the use of gas. The valve mounted in the handle portion 10 of the electrode holder is such a valve. It has been found that comfort and convenience are provided by a valve that can be actuated by a sliding motion of the operator's thumb on the hand with which he holds the electrode holder handle. Further, the valve should be compact and light weight, be economical to manufacture, and be of simple and reliable construction. In addition the valve structure should preferably serve as an electrical conductor for the welding current so as to obviate the need for a separate welding current conductor in the electrode holder handle.

To this end there is provided as part of the handle portion 10 a valve body 21 (Fig. 2). This body, preferably made as a single casting of highly conductive material such as brass, comprises a disc shaped front wall 22, two side sections or stays 23, and a rear block 25. The front wall 22 contains an axial hole through which an externally threaded metallic tubular member 26 projects. This member is preferably an integral part of conduit 20 which is part of the handle main frame and serves as a conduit to lead the shielding gas from the valve to the electrode holder body portion 11. This tubular member also conducts welding current to the electrode holder body. A short length of the internally threaded metal tubing 27, splined to receive a wrench, is screwed onto the projecting end of tubular member 26 and acts to clamp the front wall 22 of the valve body 21 between it and a shoulder 28 on tubular member 20. Thus the valve body 21 is rigidly secured as an integral part of the handle portion 10 of the electrode holder. Insulating material is molded over conduit 20 and the electrode holder body portion 11. This insulating material forms an annular projection 30 that encompasses the forward end of the valve body 21. A guide projection 31 assures accurate alignment of the valve body in the handle.

The side sections or stays 23 project rearwardly from the front wall 22 in such a manner as to provide a main valve cavity or space for valve parts between them. The rear block 25 contains an internally threaded recess 32 which terminates at its forward end in the valve body rear wall 33. An axial hole 35, countersunk on the rearward side of the wall, passes through the rear wall and places the recess 32 in communication with the main valve body cavity formed between the front and rear walls of the body and between the side sections.

A molded tube 36 of resilient rubber or the like having annular external projections 37 on one end and a flange 38 on the other end, is fitted into the body 21 from the rear, with the flange 38 seating in the countersink of the rear wall 33 and the tube passing through the hole 35 in the rear wall and into the main valve body cavity. The forward end of the resilient tube 36, including the annular sealing projections 37, fits snugly into the open rear end of tube 40 which is hard soldered to tube 27 and the annular projections 37 seat on the interior wall of tube 40. A length of rigid tubing 41, flanged at one end, fits into the forward end of resilient tube 36 to back up the annular sealing projections to effect a gas tight seal. The assembly thus far described provides a continuous passage for shielding gas from the interior of recess 32 through resilient tube 36 and rigid tubes 40 and 27 into the tubular member 26 forming a part of conduit 20 which serves as the frame of the handle portion 10 and from which the gas is supplied to the body portion 11 of the electrode holder.

A valve seat 42 in the form of an annular washer-like disc is assembled against the flange 38 of tube 36 within the recess 32. The hole in the valve seat 42 is aligned with the openings through the flange into the end of resilient tube 36. A mushroom-type valve element 43 has a head portion 45 which cooperates with the valve seat 42 and has a stem portion 46 projecting into the resilient tube 36. By mushroom-type valve is meant a valve having a flat-sided circular head and a spindle type stem. Such valves are also sometimes referred to as disc valves or poppet valves.

The mushroom-type valve 43 is of a special configuration adaptable to this particular assembly. The head 45 has a number of longitudinal peripheral slots or flutes 47 (Fig. 6) for the passage of gas therebeyond. An annular groove 48 is formed on the underside of the valve head to receive an O-ring 50. The valve stem 46 is of smaller diameter than the interior of tube 36 so as to provide an annular space around the stem and within the tube for the passage of gas. The forward end of the valve stem is preferably enlarged to approximately the internal diameter of tube 36 to provide a reasonably snug fit in the tube. Longitudinal peripheral slots or flutes 51 permit the passage of gas beyond the enlarged end of the valve stem. A helical spring 52 seats on the top of the valve head 45 and is compressed by a cap 53 which is externally threaded to engage the internal thread of recess 32. An axial hole 55 admits gas to the cap 53. When the cap 53 is assembled to the valve body the spring 52 is compressed and it bears on the back of the valve head 45 whereby a gas-tight seal is formed between the valve head portion 45, the O-ring 50, and the valve seat 42 preventing the flow of gas from recess 32 (interior of cap 53) into resilient tube 36. Cap 53 screws all the way in recess 32 to firmly clamp the valve seat 42 and the resilient tube flange 38 against the back wall 33 of valve body 21. The valve seat 42 is preferably made of soft copper so as to additionally function as a gasket between the wall 33 and the cap 53. The forward end of conduit 16, which supplies shielding gas and welding current to the electrode holder is assembled to the back of cap 53 in such a manner that shielding gas is admitted through the axial hole 55 in cap 53 to the recess 32. Cap 53 and valve body 21 are made of electrically conductive material so that they can satisfactorily transfer welding current from the conductor 18 to the member 26 from which it is conducted through conduit 20 and the body portion of the electrode holder and the chuck 13 to the welding electrode 12.

Figure 4:
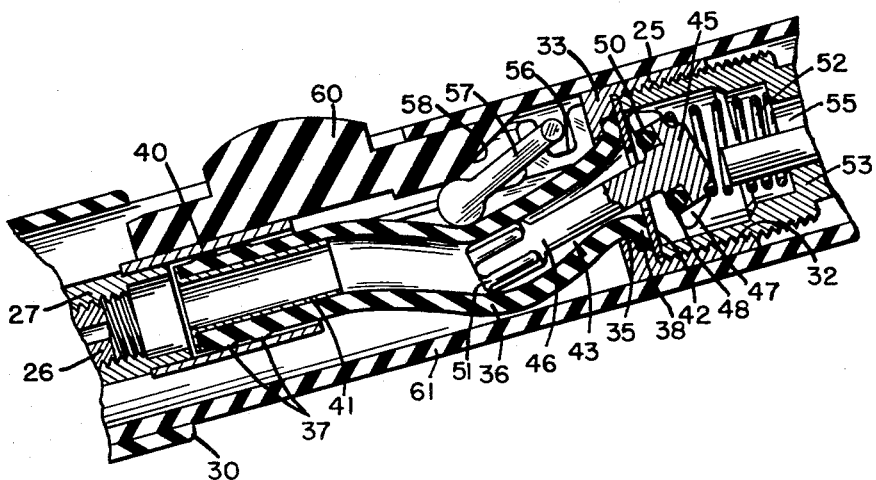
Figure 4 is similar to Figure 3 but shows the relationship of the parts when the valve is open.

Notches 56 are provided in the top of the valve body 21 just forward of the rear wall 33 to provide bearing surfaces for one end of a lever 57. The lever 57 has one end pivoted in the notches 56 and the other end is free to move in an arcuate path when acted upon by the inclined end 58 of a thumb operated cam or slide 60. This slide 60 rests on and slides along the top surface of tube 40. The lever 57 has an enlarged portion which projects into the main valve cavity and engages the top surface of resilient tube 36 at a point opposite the enlarged portion of the valve stem 46. When this lever is pivoted in its bearings in notches 56 as a result of engagement by the inclined face 58 of slide 60 the resilient tube 36 is deformed. This results in the mushroom valve head 45 being tipped up on one side disengaging the seat 42 (Figure 4). The thumb actuated slide 60 when in the forward position does not bear against the lever 57, but when moved rearwardly the inclined face 58 depresses the lever 57 which in turn deforms the tube 36 and unseats the valve. An annular insulating cover 61 slips over the valve body and assembly and under annular projection 30 of the molded insulating material and holds the sliding element 60 and the lever 57 in their respective operating positions and also acts as a portion of the handle of the electrode holder. The thumb grip of slide 60 projects through an appropriate slot in cover 61. Insulating cap 62 screws onto an internally and externally threaded assembly nut 63 to hold cover 61 in place and completely insulate the assembly. Assembly nut 63 also serves to attach the welding current conductor 18 and the gas conduit 17 to the cap 53. When the slide 60 is fully retracted the inclined face 58 overrides the end of the lever 57 so that the engagement between the lever and the slide is on the flat undersurface of the slide and the valve will remain open even if thumb pressure is released. When the slide is partially retracted the contact between the cam element and the slide is on the inclined face 58 of the slide and if thumb pressure is released the spring 52 bearing on the valve head 45 will force the valve to its closed position and return the sliding element to its forward position. The annular sealing projections 37 on the forward end of resilient tube 36, backed up by metallic tubular member 41, provides a gas tight seal of the forward end of resilient tube 36 even if there is some longitudinal sliding motion of the tube 36 in rigid tube 40 when the tube is deformed to open the valve.

The above described construction provides a valve which is completely sealed and requires no packing. The resilient tube is deformed only when the valve is open and is relaxed when the valve is closed. This is an advantage in that the resilient material will normally be relaxed and will therefore have a much longer service life than if the resilient material were stressed when the valve is closed and relaxed only during periods in which the valve is open.

I claim:

A valve structure comprising a valve seat, a mushroom-type valve element having a head portion which seats on said valve seat and a stem portion, a resilient tube which forms part of the gas flow passage of said valve and which encloses said stem portion of said valve element, means biasing said valve head portion into seating engagement with said valve seat, and means external to said resilient tube comprising a sliding cam having an inclined cam face, and a lever cooperating with said cam and engaging the external surface of said resilient tube to laterally displace a portion of said tube and the enclosed valve stem to unseat said valve head portion from said valve seat.

References Cited in the file of this patent

UNITED STATES PATENTS

| | | |
|---|---|---|
| 1,418,592 | McGee | June 6, 1922 |
| 2,149,584 | Davis | Mar. 7, 1939 |
| 2,310,164 | Prendergast | Feb. 2, 1943 |
| 2,376,265 | Meredith | May 15, 1945 |
| 2,444,767 | Cobean | July 6, 1948 |
| 2,512,281 | Loftstrand | June 20, 1950 |
| 2,525,615 | Peck | Oct. 10, 1950 |
| 2,572,658 | Perkins | Oct. 23, 1951 |

FOREIGN PATENTS

| | | |
|---|---|---|
| 373,874 | Italy | May 10, 1939 |